(12) United States Patent
Kelty

(10) Patent No.: US 8,773,066 B2
(45) Date of Patent: Jul. 8, 2014

(54) METHOD AND APPARATUS FOR EXTENDING LIFETIME FOR RECHARGEABLE STATIONARY ENERGY STORAGE DEVICES

(75) Inventor: Kurt Russell Kelty, Palo Alto, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 285 days.

(21) Appl. No.: 12/859,254

(22) Filed: Aug. 18, 2010

(65) Prior Publication Data

US 2012/0046795 A1 Feb. 23, 2012

(51) Int. Cl.
*H02J 7/00* (2006.01)
(52) U.S. Cl.
USPC .......................................... 320/109; 320/104
(58) Field of Classification Search
USPC ....................................................... 320/109
See application file for complete search history.

(56) References Cited

U.S. PATENT DOCUMENTS

| | | | |
|---|---|---|---|
| 2008/0046387 A1* | 2/2008 | Gopal et al. | 705/412 |
| 2008/0281663 A1* | 11/2008 | Hakim et al. | 705/8 |
| 2009/0093916 A1* | 4/2009 | Parsonnet et al. | 700/286 |
| 2009/0302681 A1* | 12/2009 | Yamada et al. | 320/126 |

* cited by examiner

*Primary Examiner* — Drew A Dunn
*Assistant Examiner* — Robert Grant
(74) *Attorney, Agent, or Firm* — J. Richard Soderberg

(57) ABSTRACT

A flexible management system and method for efficiently operating energy storage devices to extend the lifetime and decrease costs includes (a) determining an active energy consumption period for the energy storage device; (b) determining an inactive energy consumption period for the energy storage device; (c) operating the energy storage device in a usage mode during the active energy consumption period; and (d) operating the energy storage device in a storage mode during the inactive energy consumption period.

15 Claims, 7 Drawing Sheets

METHOD AND APPARATUS FOR EXTENDING LIFETIME FOR RECHARGEABLE STATIONARY ENERGY STORAGE DEVICES

BACKGROUND OF THE INVENTION

The present invention relates generally to an extension of an effective operational lifetime to stationary rechargeable batteries, and more particularly to stationary rechargeable batteries usable in energy storage devices (e.g., community energy storage and the like).

The electric utility system is evolving. The conventional utility includes one-way power flow from electricity generators to residential and commercial loads (through a multitude of transformers, transmission lines, and distribution lines). There is an expectation that future generations of utility systems will provide smart grid elements that include two-way power flow with multi-stakeholder interactions. Energy storage is a key central component of these solutions, and is important in the future success of the future generations. Energy storage, in the form of rechargeable batteries, may be used in many different locations and for a range of applications. A common attribute for these energy storage devices is that they will be high capacity stationary batteries.

Community Energy Storage is a concept for distributed energy storage initiated by American Electric Power, a large generator of electricity. Implementation of the concept is intended to provide a utility, and its customers, several benefits, including load leveling, back-up power, support for plug-in electric car deployment as well as grid regulation and improved distribution line efficiencies. As more renewable energy sources such as wind and solar are integrated into the smart grid, managing and storing energy is essential due to the intermittent nature of these power sources.

A trade organization, the Electricity Storage Association, has identified three major functional categories for large-scale stationary applications. These categories include power quality, bridging power, and energy management. Power quality is the provision of stored energy for seconds or less, as needed, to assure continuity of quality power. Bridging power is the provision of stored energy seconds to minutes to assure continuity of service when switching from one source of energy generation to another. Energy management is the provision of energy storage media to decouple the timing of generation and consumption of electric energy. An application of energy management is "load leveling" wherein a storage device is charged when energy cost is relatively low with the stored energy used when needed. Some degree of grid-independence is achieved, dependent upon the storage capacity and utilization.

High quality energy storage solutions are advantageously used in each of these categories. While the operational parameters may vary for the different uses, these storage solutions will typically include one or more rechargeable battery elements (e.g., cells, modules, assemblies, and combinations thereof and the like). Differing storage technologies may be appropriate for different aspects of these technologies. Each technology includes inherent limitations and disadvantages that inform practical and economic application of the technology in specific applications. (The development of improved and new technologies can skew the applications, so any assessment simply reflects a snapshot in time of the technology and application(s). Table 1 below includes a brief description of capability of various technologies.

TABLE 1

| Storage Technology | Main Advantages (relative) | Disadvantages (relative) | Power Application | Energy Application |
|---|---|---|---|---|
| Pumped Storage | High Capacity, Low Cost | Special Site Requirement | 4 | 1 |
| CAES | High Capacity, Low Cost | Special Site Requirement, uses Gas Fuel | 4 | 1 |
| Flow Batteries: PSB, VRB, ZnBr | High Capacity, Independent Power & Energy Ratings | Low Energy Density | 2 | 1 |
| Metal-Air | Very High Energy Density | Electric Charging is difficult | 4 | 1 |
| NaS | High Power & Energy Densities, High Efficiency | Production Cost, safety concerns | 1 | 1 |
| Li-ion | High Power & Energy Densities, High Efficiency | High Production Cost, requires special charging circuit | 1 | 3 |
| Ni—Cd | High Power & Energy Densities, Efficiency | Not feasible or economical | 1 | 2 |
| Other Advanced Batteries | High Power & Energy densities, High Efficiency | High Production Costs | 1 | 3 |
| Lead-Acid | Low Capital Cost | Limited Cycle Life when deeply discharged | 1 | 3 |
| Flywheels | High Power | Low Energy density | 1 | 3 |
| SMES, DSMES | High Power | Low Energy density, high production cost | 1 | 4 |
| E.C. Capacitors | Long cycle life, high efficiency | Low energy density | 1 | 2 |

1—Fully capable/reasonable;
2—Reasonable;
3—Feasible;
4—Not Feasible/Economical

The Li-ion technologies are a particular area of focus for development because this technology is a dual-use technology, being very useful for plug-in electric vehicles as well as stationary energy storage applications.

Lifetime and life cycle are two important parameters, among others, that are considered when selecting a particular storage technology for a particular application. Both parameters affect overall storage cost. A short lifetime increases the total cost of the storage device. Per year cost is one way to evaluate a cost of storing energy. Likewise, low cycle life also increases a total cost as the storage device will be replaced more often the lower the cycle life. Another Parameter that is applicable in certain applications is per-cycle cost. Per cycle cost is one way to evaluate a cost of storing energy in frequent charge/discharge applications, such as load leveling.

Costs and tradeoffs of the various technologies continue to change and evolve. What is needed is a flexible management system and method for efficiently operating energy storage devices to extend the lifetime, cycle life and consequently decrease the costs.

BRIEF SUMMARY OF THE INVENTION

Disclosed is a flexible management system and method for efficiently operating energy storage devices to extend the lifetime, cycle life and consequently decrease the costs. The method includes (a) determining an active energy consumption period for the energy storage device; (b) determining an inactive energy consumption period for the energy storage device; (c) operating the energy storage device in a usage mode during the active energy consumption period; and (d) operating the energy storage device in a storage mode during the inactive energy consumption period.

An energy management system for an energy storage device includes: a charging system coupled to the energy storage device; a collection system for gathering a set of operational parameters of the energy storage device, the set of operational parameters including data permitting determination of both an active period for the energy storage device and an inactive period for the energy storage device; and a controller, coupled to the charging system and to the collection system, to determine, responsive to the set of operational parameters, an active period for operation of the energy storage device and an inactive period for operation of the energy storage device, the controller operating the charger to charge the energy storage device to a usage state-of-charge (SOC) when the energy storage device is in the active mode and the controller operating the charger to charge the energy storage device to a storage SOC when the energy storage device is in the inactive mode.

Rechargeable energy storage devices such as Li-ion technologies have an operational lifetime that is greatly degraded by storage at full state of charge (SOC). Operational lifetime may be extended by selectively providing a reduced SOC for these types of energy storage devices when in an inactive mode and bringing them to a full SOC in anticipation of an actual or possible need. This extends lifetime of the energy storage devices and reduces the overall cost. Other features, benefits, and advantages of the present invention will be apparent upon a review of the present disclosure, including the specification, drawings, and claims.

DETAILED DESCRIPTION OF THE INVENTION

Embodiments of the present invention provide methods and systems for a flexible management system and systems and methods for efficiently operating energy storage devices to extend the lifetime and decrease costs. The following description is presented to enable one of ordinary skill in the art to make and use the invention and is provided in the context of a patent application and its requirements. In the following text, the terms "energy storage assembly" "battery", "cell", "battery cell" and "battery cell pack" "electric double-layer capacitor" and "ultracapacitor" may be used interchangeably (unless the context indicates otherwise" and may refer to any of a variety of different rechargeable configurations and cell chemistries described herein including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other chargeable high energy storage type/configuration. Embodiments of the present invention are directly related to stationary rechargeable energy storage devices. A context for one implementation is use of rechargeable Li-ion battery packs designed for plug-in electric vehicles (PHEV, HEV, and EV and the like) as community energy storage (CES). To simplify discussion, the following explains an embodiment of the present invention in this context. It is understood that the present invention has a broader applicability to use of stationary high-energy storage in a multitude of applications.

Figure 1:
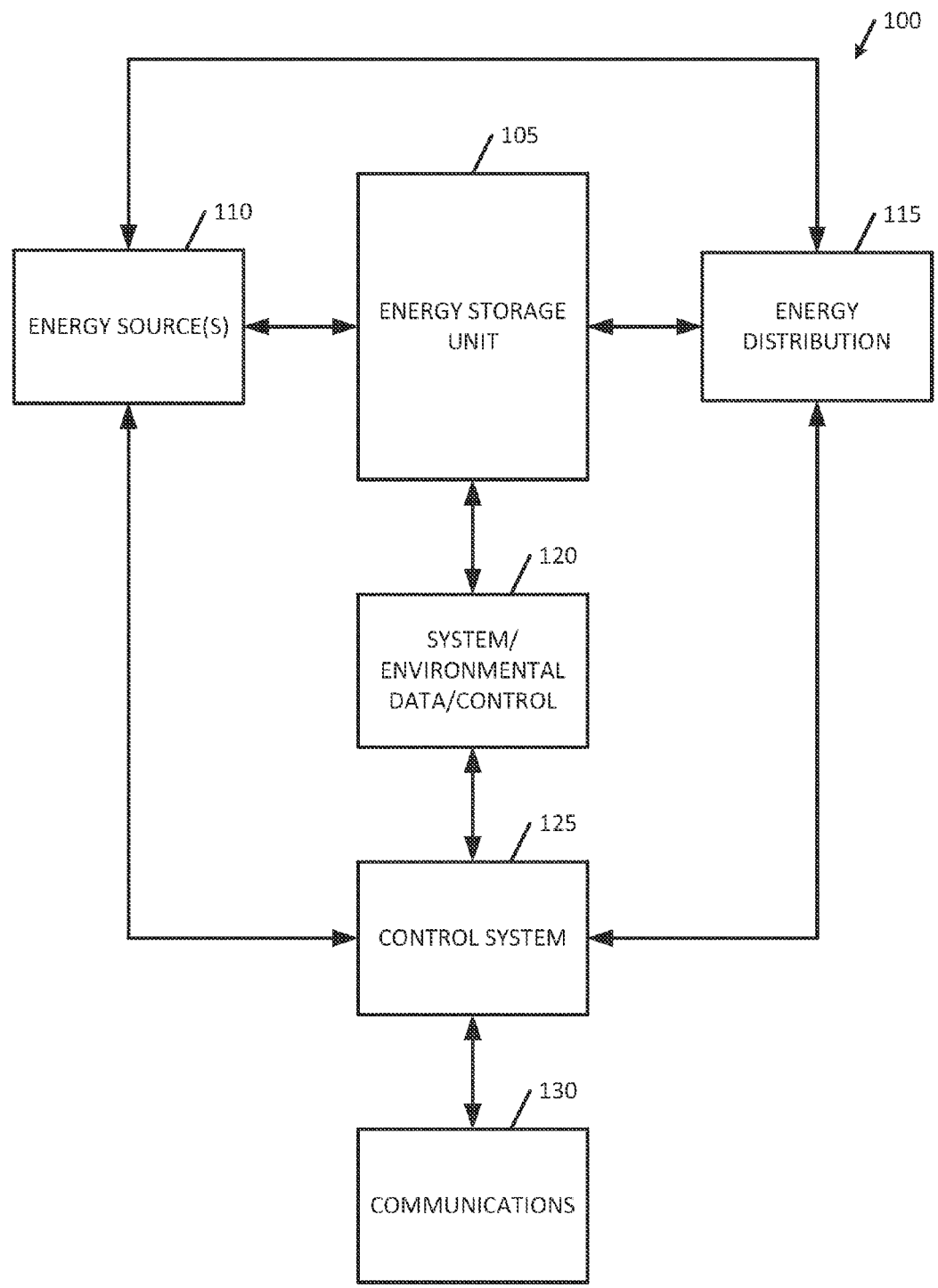
FIG. 1 is a block schematic diagram of an energy management system.

FIG. 1 is a block schematic diagram of an energy management system 100. System 100 includes an energy storage unit 105 coupled to one or more energy charging sources 110 and coupled to an energy distribution system 115. Unit 105 may be a rechargeable energy storage device using one or more of a wide range of chemistries and having many different applications. As described above, unit 105 may include a CES for servicing a small number of residences. Energy sources 110 are coupled to distribution system 115 and in some cases may be integrated together, such as when there are no non-grid energy sources. Unit 105 may have a capacity specification, for example, of power—25 KVA; energy—50 kWh; and Voltage—120V/24V. Energy sources may include solar panels, wind turbines, or the like, or may be coupled to distribution system 115 for accessing grid power.

System 100 further includes a data collection and optional actuator subsystem 120. Subsystem 120 collects operational and environmental parameters (e.g., state of charge (SOC), ambient and local temperatures and ambient pressure, and the like) of unit 105 as further detailed below. In some instances, it may be necessary or desirable to manipulate a local environment of unit 105 (for example, cooling/heating unit 105). Subsystem 120 is configurable to provide this option when appropriate. A controller 125 is coupled to subsystem 120 and through subsystem 120 to unit 105, and is coupled to sources 110 and distribution system 115 as well as to a communications link 130.

A primary focus of the embodiments of the present invention is extending a lifetime of unit 105. Some characteristics of unit 105: batteries last longer when operated at lower voltages; unit 105, particularly in the CES context, is typically implemented to provide supplemental energy during peak times of year; this peak time of year, historically, has been hot "summer" months (e.g., 1 June through 1 September in the northern hemisphere); and batteries have better storage life inversely related to storage temperature. Thus, when a consumer has limited or interrupted access to grid energy through system 115, such as when electricity demand is high or when distribution system 115 has been degraded through adverse events (weather or other forecastable actual or potential outage), energy is provided (exclusively or supplemental) by unit 105. When there is no expectation of, or small possibility for, limited/interrupted access to distribution system 115, energy from unit 105 is not needed or desired. The SOC of unit 105 is adjusted during these times to maximize battery lifetime, which for the Li-ion technology includes reducing the SOC in storage mode.

In operation, generally, controller 125 estimates whether unit 105 is in an active season or an inactive season. In some implementations, this is on a relatively slow time scale, such as monthly updates, while in other implementations the time scale may become a daily, hourly, or close to real-time scale.

Controller 125 may estimate a relevant season and determines whether system 100 is Operating using a particular one of in-season and out-season modes. As used herein, operation of unit 105 during the relevant in-season is referred to as active operation and operation of unit 105 during the relevant out-season is referred to as inactive (storage) operation. Traditionally the term "season" refers to one of spring, summer, fall, and winter. In the context of the present invention, the term is used more broadly to refer to any period for which system 100 may have an active mode or an inactive mode.

The estimates of in-season or out-season may be based upon temperature, usage trends, or receipt of an express signal from a third-party (e.g., a utility company or other source). Controller 125 may use data gathered from subsystem 120 to collect a temperature of the external ambient conditions surrounding a housing for unit 105. Controller 125 may access an internal clock or other time/season reference to assist in estimating a beginning and/or end of a season. In some embodiments, a barometer or other pressure sensor may be used to determine ambient pressure of the local environment as an aid to estimating the current season.

As noted above, when unit 105 includes Li-ion technology, sustained operation of unit 105 at or near full SOC degrades lifetime. For example, for some Li-ion embodiments, a full SOC may be represented by a cell voltage of 4.2V (for some newer technologies this may be about 4.35V). Maintaining unit 105 at this full SOC for a sustained period, in some cases one year, may result in degrading storage capacity by about 10% at the end of that year. However, maintaining a storage SOC of about 3.8V (in some cases it may be in a range of about 3.6V to about 3.9V) over that year may diminish its storage capacity by as little as 1% instead of the 10%. The specifics concerning a value of storage SOC to apply, and how to balance the amounts of time that unit 105 spends in full SOC mode and storage SOC mode are variable based upon the specifics of the implementations, goals, and objectives. The longer that unit 105 spends in storage mode and the lower the storage SOC in storage mode, the more that the lifetime of unit 105 is extended and a goal of the present invention is achieved. Depending upon several factors including cell chemistry, lowering the storage voltage too far risks damaging the storage device. For the implementations described above using the Li-ion chemistry, it is desirable to maintain the storage voltage above about 3.6 volts.

Communications link 130 enables system 100 to receive season identification signals, season forecast data and parameters, and to coordinate timing and season exception determination and operation with a central service and/or other "peer" systems in the same locale, as well as to coordinate aggregation of operation of other systems in the same general geographic area should that be necessary or desirable. For example, utility companies generally understand long term usage patterns and short-term variations in electrical demand. In some instances, such as sustained high temperatures during hot summer months, a utility is able to accurately forecast energy deficiencies and signal to systems 100 that a scheduled energy interruption is due in the immediate future. Similarly, early warning systems may signal a possibility of localized severe weather (e.g., hurricane, tornado, and the like) when there is a chance of interruption of utility energy. System 100 is able to respond to such messages to help reduce an impact on residential and commercial consumers.

It is also a goal of embodiments of the system to not only determine and implement seasonal operation in appropriate active and inactive modes, but to recognize and predict/estimate periods when exceptions to the determined seasonal mode are necessary or desirable. The shorter the time scale on the seasonal determinations, and the more that the system operates in close to real time, the less often exception processing would be expected to be needed. For example, during a period in a summer season when there is anticipated to be a sustained lower than typical demand for electrical energy (e.g., an unseasonable cold spell), controller 125 operates unit 105 in storage mode for the limited period even though system 100 is properly in the summer season and normally would be operating in the full SOC mode.

Similarly, in an inactive season when system 100 is operating in storage SOC mode, controller 125 may determine that there is a forecast for unseasonably warm weather or a major weather event that may result in disconnecting system 100 from distribution system 115, controller 125 will provide a short term adjustment and operate unit 105 in full SOC mode in anticipation that additional energy will or may be necessary. It is expected that for most implementations using Li-ion technologies, it takes but a few hours to charge unit 105 to full SOC mode from storage SOC mode. When the exception event resolves controller 125 returns system 100 to normal seasonal operation.

Another feature of some embodiments of the present invention is that controller 125 will monitor a local temperature of unit 105. It is known that sustained operation of Li-ion battery chemistry cells at elevated temperatures decreases lifetime expectancy. Controller 125 may decrease the SOC of unit 105, in either active or inactive mode (or both) depending upon implementation details, to limit damage to the lifetime expectancy. The high temperature threshold may be 30° C. or 40° C., or other value depending upon implementation details.

In the above-described embodiments, part of the implementation details relate to decisions regarding trade-offs in energy consumption and battery lifetime extension. Different applications will result in different threshold and trigger points for implementation of active season and inactive season. The present invention is able to accommodate a wide range of choices.

Figure 2:
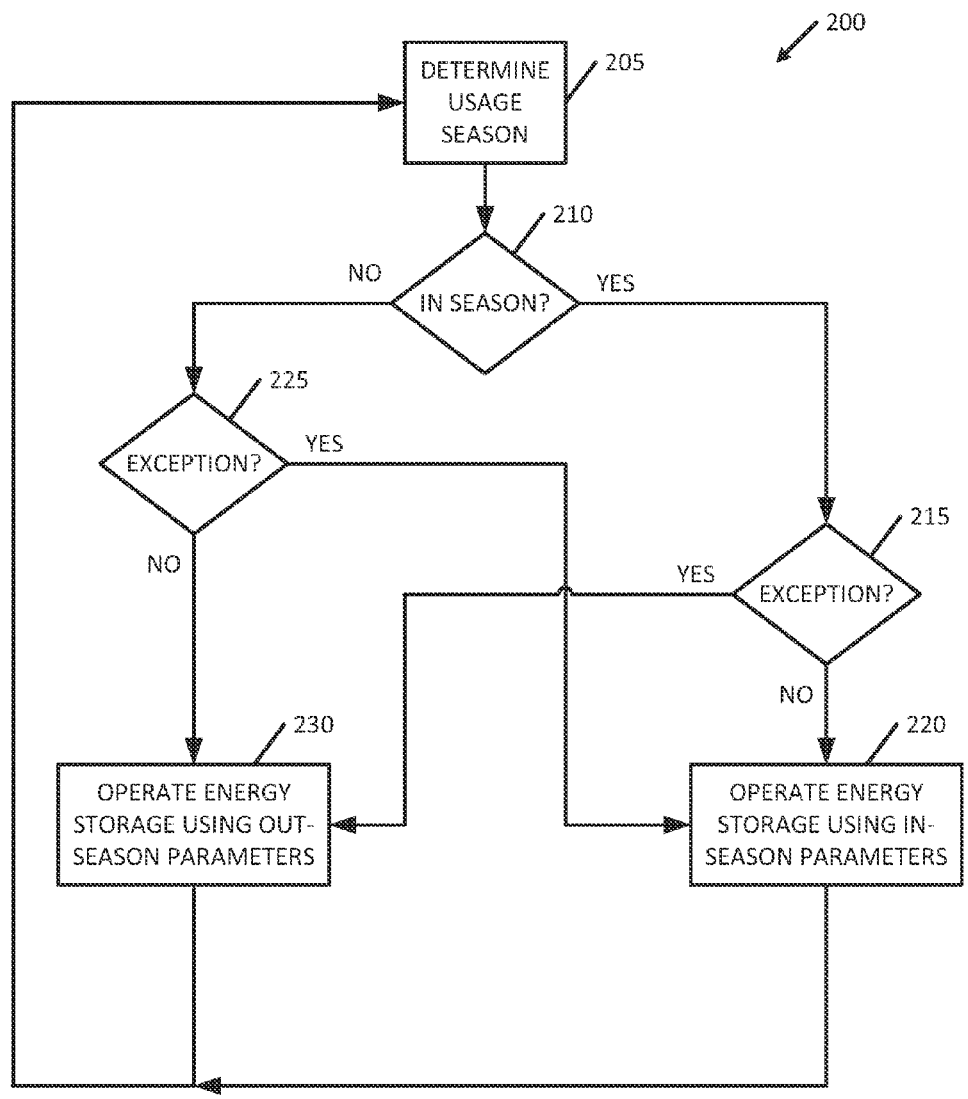
FIG. 2 is a flow diagram of an energy management process.

FIG. 2 is a flow diagram of an energy management process 200. Process 200 begins with step 205, determining a usage season. Determining the usage system includes setting a start and an end for the relevant season (on some time scale—for example quarterly, monthly, weekly, daily, hourly, or the like). Step 205 determines one or more relevant seasons as identified herein and uses local and remote parameters to directly or indirectly determine/estimate season begin and end points.

Following step 205, process 200 checks at step 210 whether the system is "in season"—within a relevant season determined by step 205. When the test at step 210 is "YES" process 200 thereafter branches to a first exception test step 215. The test at step 215 determines whether there is a reason to operate unit 105 in an out-season (e.g., inactive or storage) mode even though process 200 is operating nominally between the start and end times of a relevant season. This could be that an unseasonably low energy demand is predicted over an immediate short term that would permit inactive mode operation and help to extend the lifetime of unit 105: When the test at step 215 is "NO" the process 200 thereafter advances to step 220 to operate the energy storage apparatus using the predetermined "in season" parameters. This typically includes operation at full SOC.

When the test at step 210 is "NO" process 200 branches to a second exception test step 225. The test at step 225 determines whether there is a reason to operate unit 105 in an in-season (e.g., active) mode even though process 200 is operating outside of a predetermined relevant season. This could be that an unseasonably high energy demand is predicted over an immediate short term that would indicate a desire or need for active mode operation. When the test at step 225 is "YES" the process 200 advances to step 220 to operate the energy storage apparatus using the predetermined "in season" parameters. This typically includes operation at full SOC as noted herein.

When the test at step 215 is "YES" or when the test at step 225 is "NO" process 200 branches to step 230 to operate the energy storage apparatus using the predetermined "out season" parameters. This typically includes operation at reduced SOC as noted herein.

After both step 220 and step 230, process periodically cycles back to step 205 to determine whether there is any change in the beginning or end of the operational season. Process 200 may operate on a relatively slow time scale or update daily our hourly.

Figure 3:
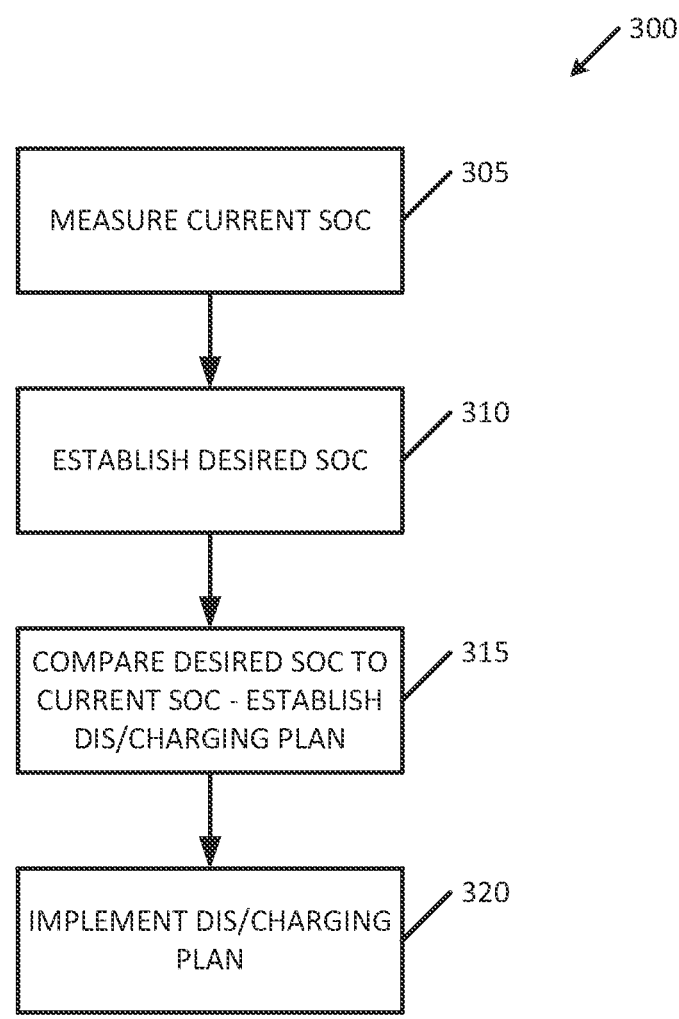
FIG. 3 is a detailed flow diagram for an energy storage process shown in FIG. 2.

FIG. 3 is a detailed flow diagram for energy storage process 300, such as steps 220 and 230 shown in FIG. 2. Process 300 includes a step 305 to measure the current SOC of the energy storage unit. Next, process 300 includes a step 310 to establish a desired SOC, based upon the in-season and exception tests noted herein. The desired SOC is either the full SOC for in-season or out-season exception operation or reduced SOC for out-season or in-season exception.

Following step 305 and step 310, process 300 compares the desired SOC to the current SOC to establish a dis/charging plan. In some cases, the SOC will need to be increased while in other cases the SOC will need to be decreased. Depending upon timing and other considerations, it may be necessary to relatively quickly increase SOC from storage mode to full SOC. Generally it is expected that it may take but a few hours to increase SOC from the storage mode to full SOC. Depending upon implementation, decreasing SOC from full SOC to the desired lower level SOC may be achieved by attaching a load to the storage device or routing energy out of the storage device into the grid (e.g., distribution system 115). Once the dis/charging plan has been established at step 315, process 300 advances to step 320 to actually implement the dis/charging plan.

In the discussion above, some specific voltages and temperatures were identified for particular embodiments. As noted, the specific values are subject to adaptation for particular cell chemistries, applications, and implementations. The present invention is not necessarily limited to these particular values as other cell chemistries, applications, and implementations may suggest alternatives. The following graphs of FIG. 4-FIG. 7 help to demonstrate some of the tradeoffs. In a more generalized description of the invention, for Li-ion chemistries having a full SOC at about 4.2V-4.35V, a storage SOC of about 3.6V- to about 3.9V was described. A different way to express a range for the storage mode is as a percentage of the full SOC. For example, a preferred embodiment of the present invention may include a storage mode in a range of about 20%-80% full SOC. Below 20%, risks of overdischarge may become unacceptable. Much over 80% becomes too close to full SOC, losing the benefit of lower degradation. These values may, of course, be varied. Information such as provided in the graphs may help in setting the desired tradeoffs for the specific application.

Figure 4:
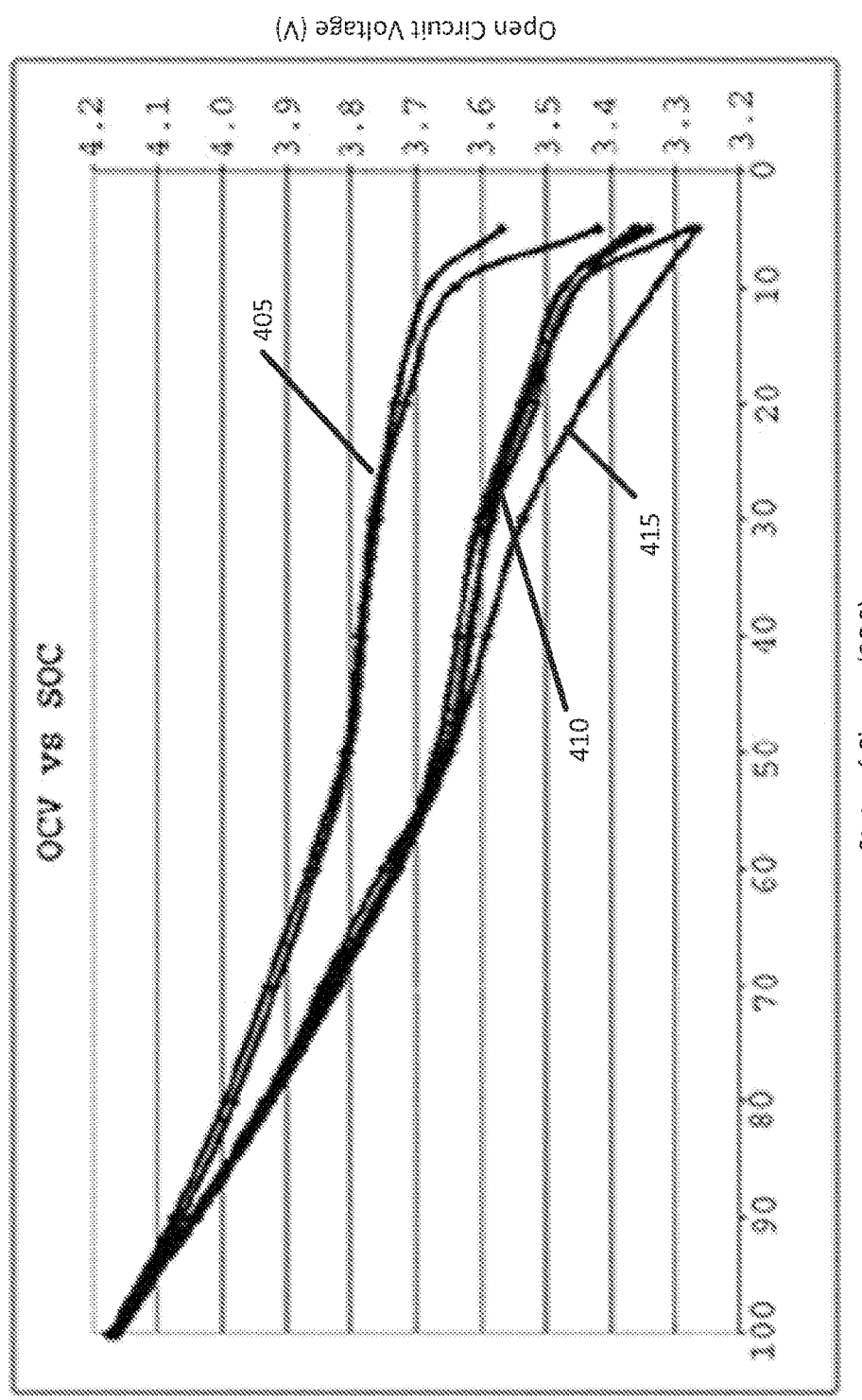
FIG. 4 is a representative graph of open circuit voltage versus state of charge.

FIG. 4 is a representative graph of open circuit voltage versus state of charge. There are three different representative cells, for example cell A 405, cell B 410, and cell C 415. A graph such as the one shown in FIG. 4 helps to convert between SOC and corresponding open circuit voltage.

Figure 5:
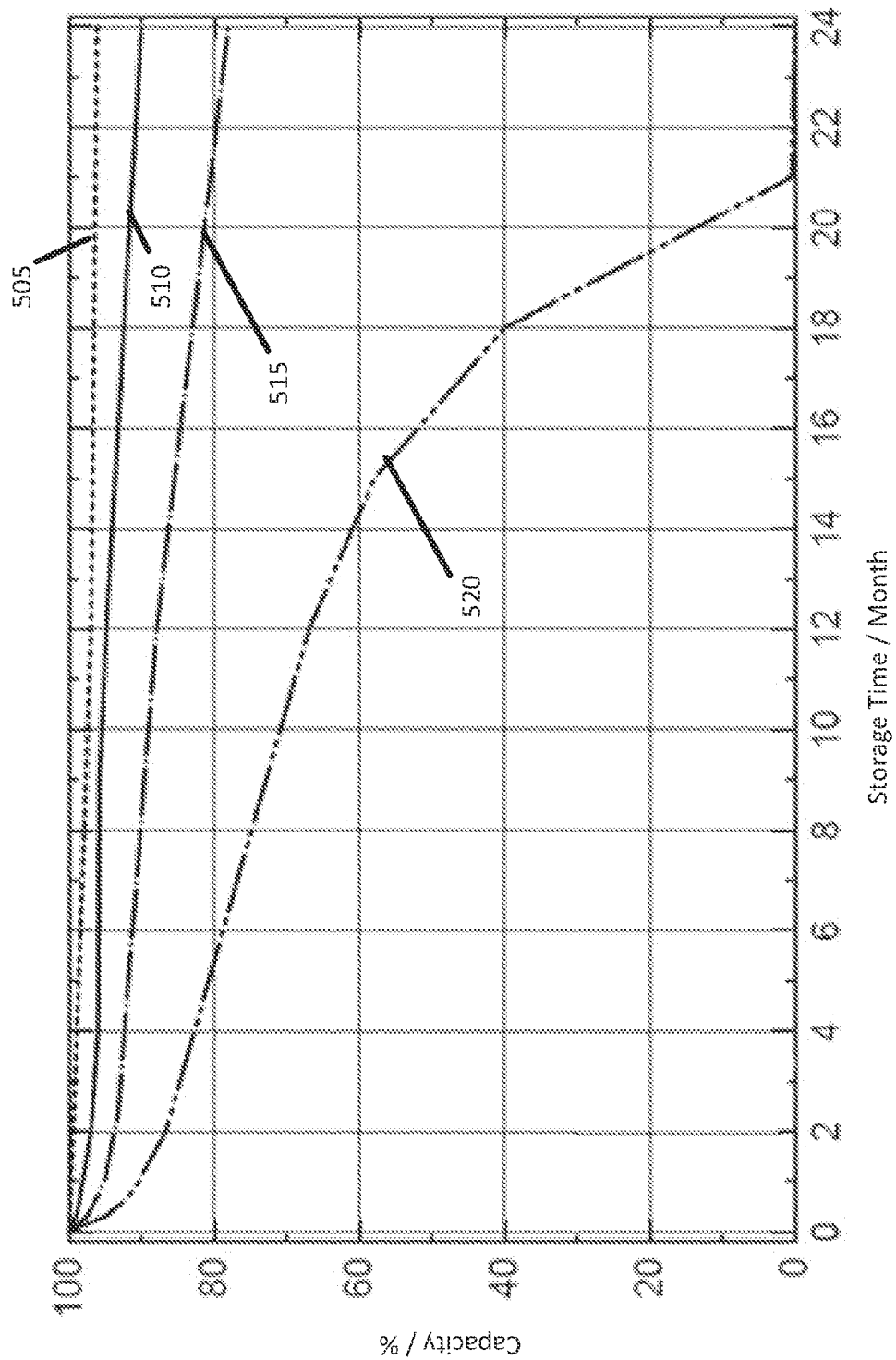
FIG. 5 is a representative graph of battery cell capacity retention (lifetime) for various temperatures.

FIG. 5 is a representative graph of battery cell capacity retention (lifetime) for various temperatures. FIG. 5 represents recoverable capacity when the storage condition is 100% charged for a typical Li-ion battery cell. Charging cycle is: CC-CV:2.3A-4.2V (3 hours, cut) and discharge :CC:2.3A (E.V.:2.75V). FIG. 5 includes 4 plots, each plot corresponding to a storage temperature. Plot 505 corresponds to 0° C., plot 510 corresponds to 20° C., plot 515 corresponds to 40° C. and plot 520 corresponds to 60° C. The lifetime is extended at the lower temperature.

Figure 6:
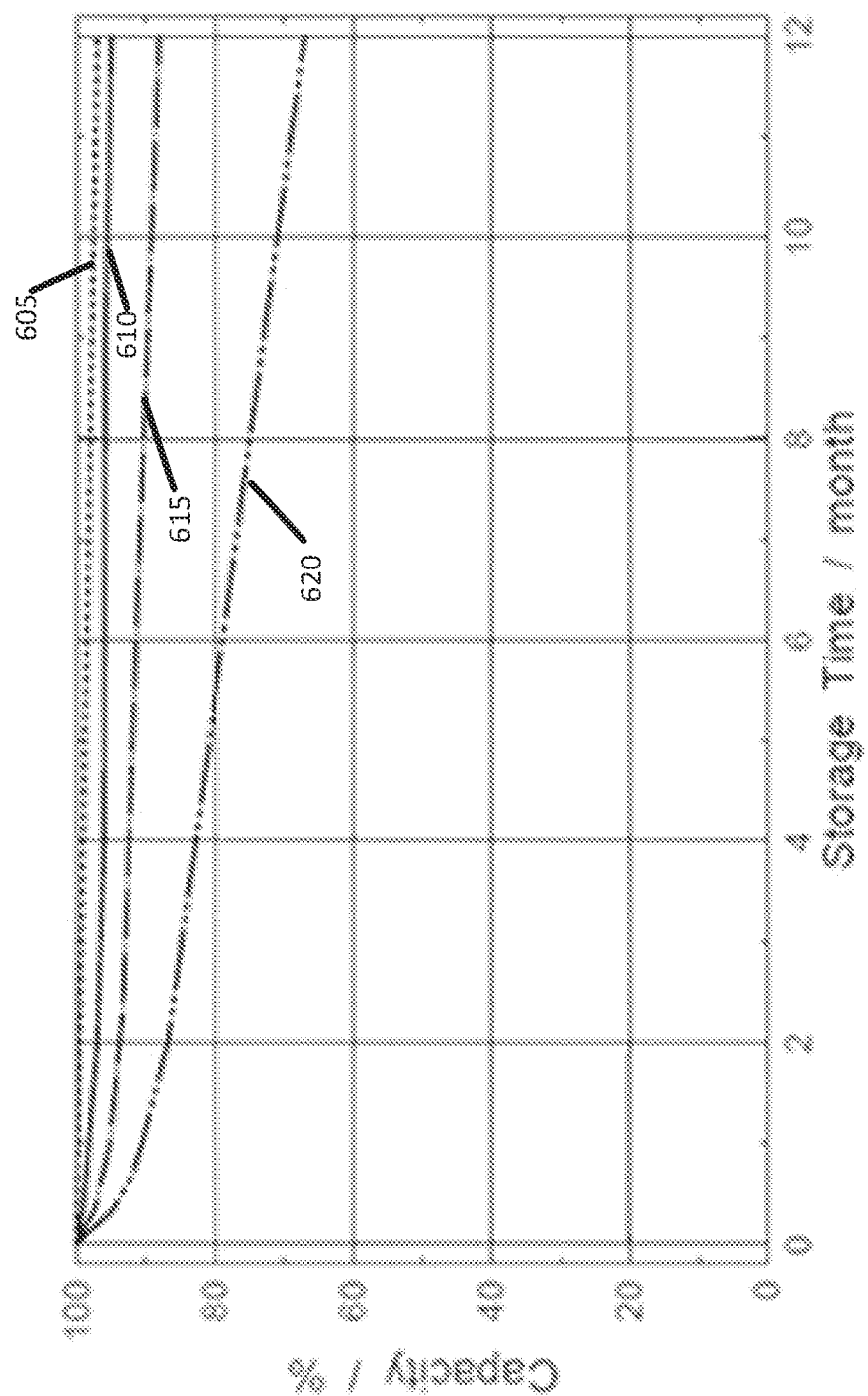
FIG. 6 is a representative graph of battery cell capacity retention (lifetime) at 100% storage charge for various temperatures.
Figure 7:
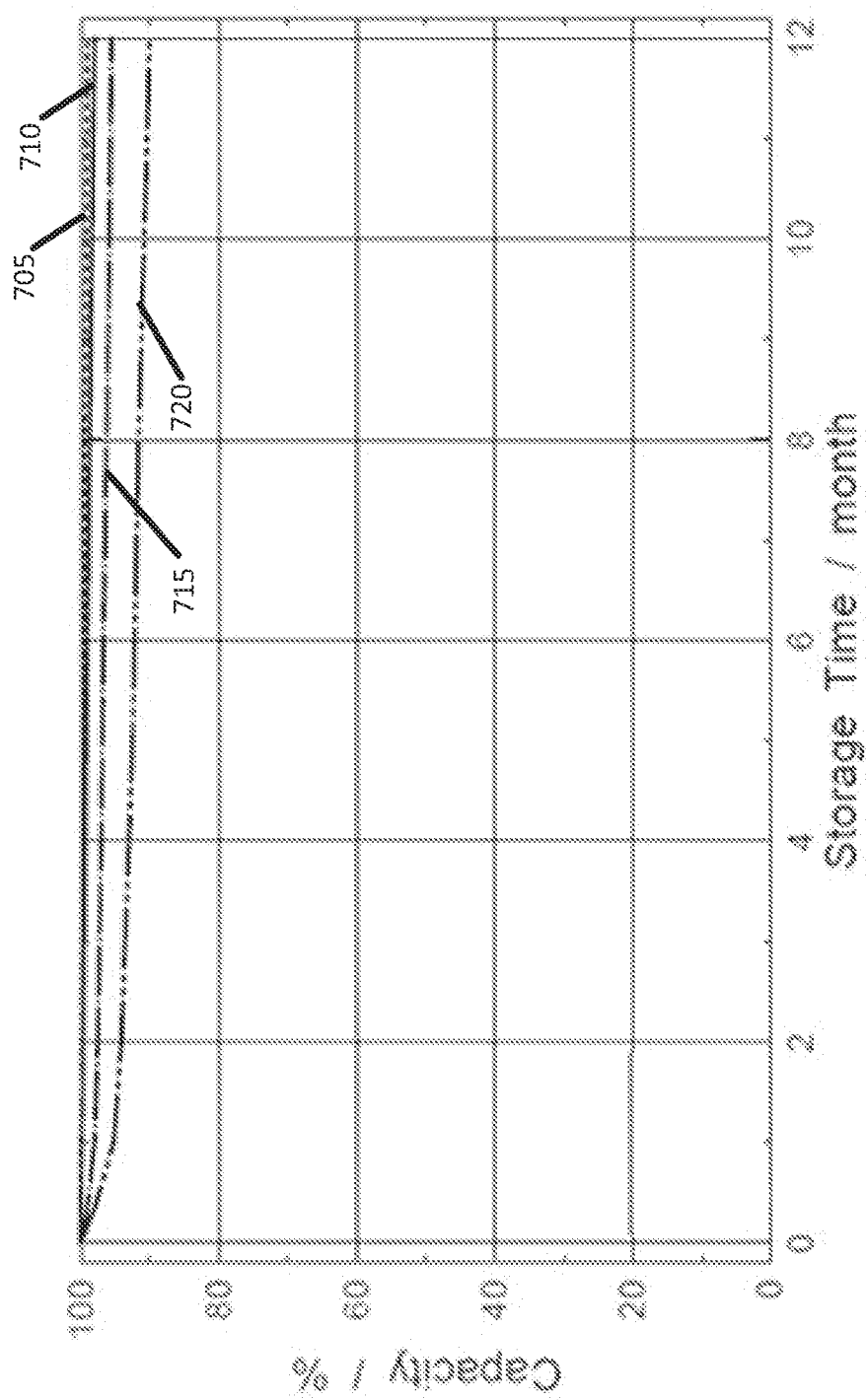
FIG. 7 is a representative graph of battery cell capacity retention (lifetime) at 35% storage charge for various temperatures.

FIG. 6 and FIG. 7 help to illustrate an advantage of embodiments of the present invention. FIG. 6 is a representative graph of battery cell capacity retention (lifetime) at 100% storage charge for various temperatures and FIG. 7 is a representative graph of battery cell lifetime at 35% storage charge for those temperatures. FIG. 6 and FIG. 7 are graphs of recoverable capacity (100% charged and 35% charged, respectively) for typical Li-ion cell chemistry under conditions as identified above for FIG. 5 (i.e., charging cycle is: CC-CV:2.3A-4.2V (3 hours, cut) and discharge :CC:2.3A (E.V.:2.75V)).

FIG. 6 and FIG. 7 each includes 4 respective temperature plots: 0° C. (plot 605 and plot 705): 20° C. (plot 610 and plot 710); 40° C. (plot 615 and plot 715); and 60° C. (plot 620 and 720). Comparing FIG. 7 to FIG. 6 illustrates a representative advantage of storing a cell at a reduce SOC.

The system and methods above have been described in the preferred embodiment of charging a stationary energy storage unit used in stationary energy storage systems. For ease of understanding and simplification of discussion, the embodiments of the present invention have focused on implementation using lithium metal oxide technology in the energy storage unit. It is possible to adapt the present invention to other battery technologies to similarly extend their lifetimes in appropriate ways. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A computer-implemented method for operating a vehicle battery pack, the method comprising the steps of:
    implementing a vehicle battery pack for a plug-in vehicle as a community energy storage connected to a utility grid;
    defining an active energy consumption season for the vehicle battery pack based at least on seasonal temperature information;
    performing a season exception determination based at least on a short-term weather prediction;
    operating the vehicle battery pack in a usage mode (i) during said active energy consumption season except when the season exception determination indicates otherwise, and also (ii) outside of the active energy consumption season as indicated by the season exception determination, wherein said usage mode includes charging the vehicle battery pack to a full state-of-charge (SOC) in each charging session; and
    operating the vehicle battery pack in a lifetime-extending storage mode (i) outside of the active energy consumption season except when the season exception determination indicates otherwise, and also (ii) during the active energy consumption season as indicated by the season exception determination, wherein said storage mode includes charging the vehicle battery pack to a lifetime prolonging SOC less than the full SOC in each charging session.

2. The computer-implemented method of claim 1 wherein said defining step includes estimating said active energy consumption season from evaluations of one or more operating parameters.

3. The computer-implemented method of claim 2 wherein said one or more operating parameters include one or more of an environmental temperature of a volume surrounding the vehicle battery pack, a forecast for the environmental temperature, an energy consumption trend for the vehicle battery pack, a period indicator signal provided to the vehicle battery pack from an external process, a period indicator signal provided to the vehicle battery pack from an internal process, an atmospheric pressure of the volume, a forecast of the atmospheric pressure of the volume, a weather forecast, and combinations thereof.

4. The computer-implemented method of claim 3 wherein the vehicle battery pack includes rechargeable lithium ion battery cells and wherein said lifetime prolonging SOC is in a range of about 20% to about 80% of said full SOC.

5. The computer-implemented method of claim 1 wherein said active season corresponds to a local community-wide sustained elevated energy consumption pattern.

6. The computer-implemented method of claim 1 wherein the vehicle battery pack includes a housing containing energy storage elements, wherein an internal temperature of said housing is measured, and wherein a state-of-charge (SOC) target for at least one of said modes is reduced when said internal temperature exceeds a predetermined level.

7. The computer-implemented method of claim 6 wherein said predetermined level for said internal temperature is about 30° C. or greater.

8. The computer-implemented method of claim 7 wherein said reduced SOC for said active mode in a range of about 20% to about 80% of said full SOC.

9. An energy management system for a vehicle battery pack, comprising:
    a vehicle battery pack for a plug-in vehicle implemented as a community energy storage connected to a utility grid;
    a charging system coupled to the vehicle battery pack;
    a collection system for gathering a set of operational parameters for the vehicle battery pack, said set of operational parameters including data permitting determination of an active season for the energy storage device, the data including seasonal temperature information and a short-term weather prediction; and
    a controller, coupled to said charging system and to said collection system, to (A) determine, responsive to said set of operational parameters, the active season for operation of the vehicle battery pack, and (B) perform a season exception determination based at least on the short-term weather prediction, said controller operating the vehicle battery pack in a usage mode (i) during the active season except when the season exception determination indicates otherwise, and also (ii) outside of the active season as indicated by the season exception determination, the usage mode comprising controlling said charging system to charge the vehicle battery pack to a full state-of-charge (SOC) in each charging session, and said controller operating the vehicle battery pack in a lifetime-extending storage mode (i) outside of the active season except when the season exception determination indicates otherwise, and also (ii) during the active season as indicated by the season exception determination, the lifetime-extending storage mode comprising controlling said charging system to charge the vehicle battery pack to a lifetime-prolonging SOC less than the full SOC in each charging session.

10. The energy management system of claim 9 wherein said one or more operating parameters include one or more of an environmental temperature of a volume surrounding the vehicle battery pack, a forecast for the environmental temperature, an energy consumption trend for the vehicle battery pack, a period indicator signal provided to the vehicle battery pack from an external process, a period indicator signal provided to the vehicle battery pack from an internal process, an atmospheric pressure of the volume, a forecast of the atmospheric pressure of the volume, a weather forecast, and combinations thereof.

11. The energy management system of claim 9 wherein the vehicle battery pack includes rechargeable lithium ion battery cells and wherein said lifetime prolonging SOC is in a range of about 20% to about 80% of said full SOC.

12. The energy management system of claim 9 wherein said active season corresponds to a community-wide sustained elevated energy consumption pattern.

13. The energy management system of claim 9 wherein the vehicle battery pack includes a housing and wherein an internal temperature of said housing is measured, and wherein an SOC target for both said modes is reduced when said internal temperature exceeds a predetermined level.

14. The energy management system of claim 13 wherein said predetermined level for said internal temperature includes a temperature of at least 30° C.

15. The energy management system of claim 14 wherein said lifetime-prolonging SOC is in a range of about 20% to about 80% of said full SOC.

* * * * *